(12) United States Patent
Sanee et al.

(10) Patent No.: US 10,595,519 B1
(45) Date of Patent: Mar. 24, 2020

(54) MOTORIZED TACKLE SYSTEM FOR FISHING

(71) Applicants: Sobhan Sanee, Plano, TX (US); Kanz Kayfan, Plano, TX (US); Hassam Maleki, Tehran (IR)

(72) Inventors: Sobhan Sanee, Plano, TX (US); Kanz Kayfan, Plano, TX (US); Hassam Maleki, Tehran (IR)

(*) Notice: Subject to any disclaimer, the term of this patent is extended or adjusted under 35 U.S.C. 154(b) by 367 days.

(21) Appl. No.: 15/337,382

(22) Filed: Oct. 28, 2016

Related U.S. Application Data

(60) Provisional application No. 62/247,533, filed on Oct. 28, 2015.

(51) Int. Cl.
*A01K 85/18* (2006.01)
*A01K 93/02* (2006.01)

(52) U.S. Cl.
CPC .............. *A01K 85/18* (2013.01); *A01K 93/02* (2013.01)

(58) Field of Classification Search
CPC ........ A01K 85/18; A01K 93/02; A01K 93/00; A01K 85/16
See application file for complete search history.

(56) References Cited

U.S. PATENT DOCUMENTS

| | | | | | |
|---|---|---|---|---|---|
| 1,474,823 | A | * | 11/1923 | Hines | A01K 85/18 43/42.16 |
| 1,487,556 | A | * | 3/1924 | Goble | A01K 85/18 43/26.2 |
| 1,521,090 | A | * | 12/1924 | Goble | A01K 85/18 43/26.2 |
| 1,850,296 | A | * | 3/1932 | Vermeulen | A01K 91/065 43/15 |
| 2,555,802 | A | * | 6/1951 | Martin | A01K 85/18 43/26.2 |
| 2,607,151 | A | * | 8/1952 | Morris | A01K 85/18 43/26.2 |
| 2,618,092 | A | * | 11/1952 | Hinkle | A01K 85/18 43/42.15 |
| 2,693,047 | A | * | 11/1954 | Lumsden | A01K 91/065 43/26.1 |
| 2,726,471 | A | * | 12/1955 | Uus | A01K 91/065 43/17.5 |
| 2,955,375 | A | * | 10/1960 | Mitchell | A01K 85/16 43/17.6 |
| 3,036,403 | A | * | 5/1962 | Presnell | A63H 23/04 43/26.1 |
| 3,313,058 | A | * | 4/1967 | Fuerst | A01K 85/18 43/42.02 |
| 3,613,284 | A | * | 10/1971 | Anderson | A01K 91/02 43/26.1 |

(Continued)

FOREIGN PATENT DOCUMENTS

GB          1315695 A  *  5/1973  ............. A01K 85/18

*Primary Examiner* — Magdalena Topolski
*Assistant Examiner* — Morgan T Barlow
(74) *Attorney, Agent, or Firm* — Eldredge Law Firm

(57) ABSTRACT

A powered fishing lure includes a lower body forming a fluidly sealed cavity; a battery carried within the cavity of the lower body; an upper body forming a fluidly sealed interior area; an electric motor carried within the fluidly sealed interior area and conductively coupled to the battery; a propeller positioned outside the upper body and secured to the electric motor via a drive shaft; and a hook secured to the lower body.

1 Claim, 4 Drawing Sheets

(56) References Cited

U.S. PATENT DOCUMENTS

| | | | | |
|---|---|---|---|---|
| 3,739,516 A * | 6/1973 | Holling | A01K 91/02 | 43/26.1 |
| 3,758,975 A * | 9/1973 | Curtis | A01K 91/065 | 43/26.1 |
| 4,638,585 A * | 1/1987 | Korte | A01K 91/02 | 43/26.1 |
| 4,674,223 A * | 6/1987 | Pearce | A01K 85/18 | 43/26.2 |
| 4,959,920 A * | 10/1990 | Walker | A01K 85/18 | 43/42.15 |
| 5,016,385 A * | 5/1991 | Blease | A01K 91/08 | 43/26.1 |
| 5,077,929 A * | 1/1992 | Khan | A01K 91/02 | 43/26.1 |
| 5,111,609 A * | 5/1992 | Flo | A01K 91/065 | 43/26.1 |
| 5,293,712 A * | 3/1994 | Lo | A01K 91/02 | 43/26.1 |
| 5,829,183 A * | 11/1998 | Guerin | A01K 85/18 | 43/42.35 |
| 5,903,999 A * | 5/1999 | Petras | A01K 85/18 | 43/17.5 |
| 5,937,566 A * | 8/1999 | Buczkowski | A01K 93/02 | 43/17 |
| 6,408,565 B1 * | 6/2002 | Duncan | A01K 85/18 | 43/42.06 |
| 7,131,231 B1 * | 11/2006 | Lee | A01K 93/02 | 43/17 |
| 8,627,593 B1 * | 1/2014 | Schepp | A01K 93/00 | 43/26.1 |
| 9,474,257 B1 * | 10/2016 | McGilvry | A01K 85/02 | |
| 9,713,323 B2 * | 7/2017 | Jenkins | A01K 97/04 | |
| 10,051,847 B1 * | 8/2018 | Smith | A01K 85/18 | |
| 2001/0047609 A1 * | 12/2001 | Orgeron | A01K 85/00 | 43/42.31 |
| 2005/0102883 A1 * | 5/2005 | Temes | A01K 91/02 | 43/26.1 |
| 2006/0000137 A1 * | 1/2006 | Valdivia y Alvarado | A01K 85/01 | 43/42.2 |
| 2006/0117639 A1 * | 6/2006 | Jones | A01K 91/20 | 43/17 |
| 2006/0260177 A1 * | 11/2006 | Thomas | A01K 85/00 | 43/42.24 |
| 2007/0289196 A1 * | 12/2007 | Scott | A01K 85/18 | 43/42.15 |
| 2009/0151218 A1 * | 6/2009 | Woodhouse | A01K 97/01 | 43/8 |
| 2010/0011651 A1 * | 1/2010 | Rapelje | A01K 85/18 | 43/4.5 |
| 2010/0146837 A1 * | 6/2010 | Zernov | A01K 85/00 | 43/42.15 |
| 2010/0236130 A1 * | 9/2010 | Basso | A01K 85/01 | 43/42.31 |
| 2011/0138675 A1 * | 6/2011 | Cutts | A01K 91/02 | 43/4 |
| 2013/0036654 A1 * | 2/2013 | Goosey | A01K 85/01 | 43/42.31 |
| 2015/0033613 A1 * | 2/2015 | Colucci | A01K 85/18 | 43/42.09 |
| 2015/0068101 A1 * | 3/2015 | Calabrese | A01K 85/18 | 43/42.15 |
| 2015/0181847 A1 * | 7/2015 | Alshammari | A01K 85/005 | 43/17 |
| 2015/0289491 A1 * | 10/2015 | Mancini | A01K 85/00 | 43/17.6 |
| 2015/0342169 A1 * | 12/2015 | Zeevi | A01K 63/04 | 43/4.5 |
| 2016/0057982 A1 * | 3/2016 | Slocum | A01K 85/01 | 43/42.06 |
| 2016/0360737 A1 * | 12/2016 | Yates | A01K 85/18 | |
| 2018/0000058 A1 * | 1/2018 | Jarboe, Jr. | A01K 85/00 | |

* cited by examiner

MOTORIZED TACKLE SYSTEM FOR FISHING

BACKGROUND

1. Field of the Invention

The present invention relates generally to fishing systems, and more specifically, to a motorized tackle system for fishing.

2. Description of Related Art

Fishing systems are well known in the art and are effective means to find and catch fish. For example, FIG. 1 depicts a conventional fishing tackle system 101 having a fish shaped body and a hook. During use, the lure simulates the natural food of a fishing target, attracting the target to bite the lure. When the lure is bitten the hook sets into the target and is caught.

One of the problems commonly associated with system 101 is its limited use. For example, the lure does not move like the normal food of the target.

Accordingly, although great strides have been made in the area of tackle systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
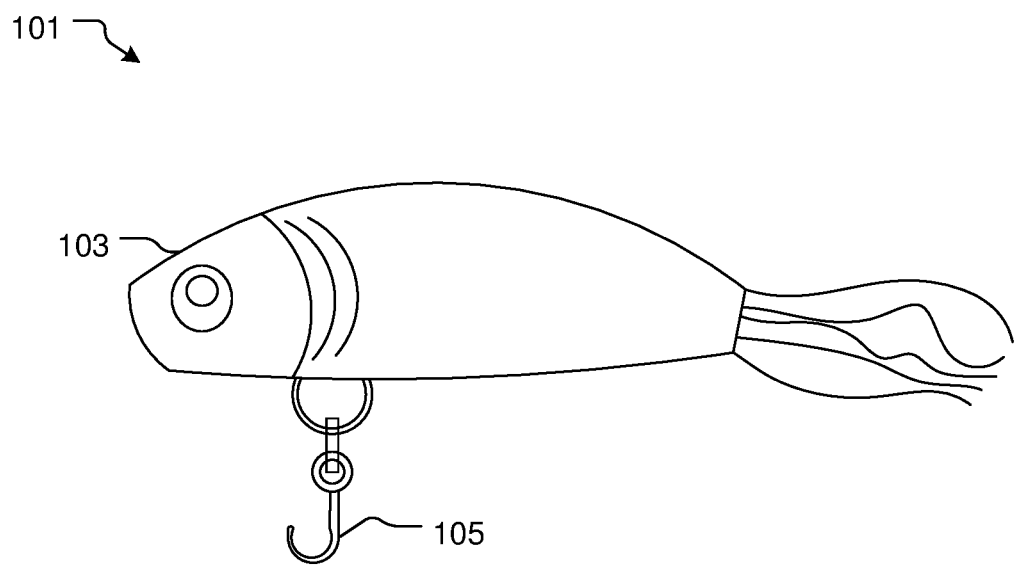
FIG. 1 is a side view of a common fishing tackle system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional filtration systems. Specifically, the motorized tackle system simulates the natural movement of the bait. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
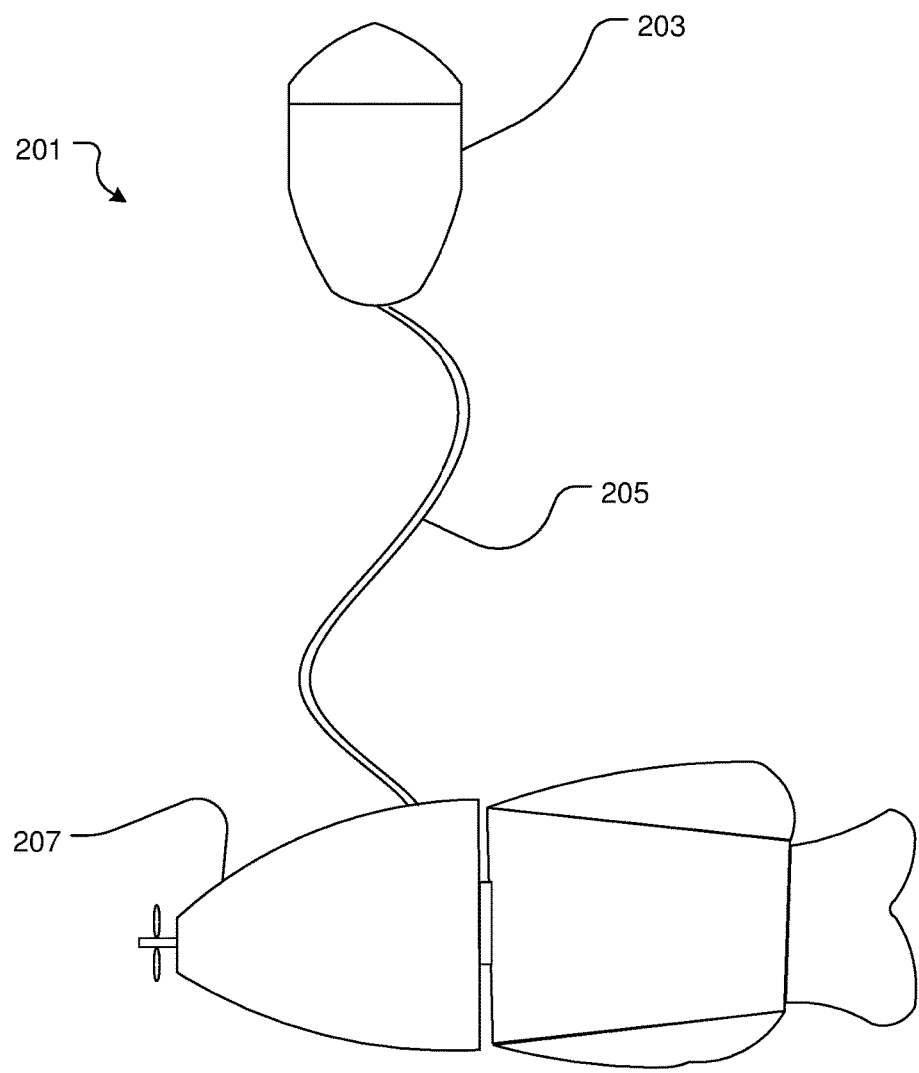
FIG. 2 is a side view of a motorized tackle system in accordance with a preferred embodiment of the present application.

Referring now to the drawings wherein like reference characters identify corresponding or similar elements throughout the several views, FIG. 2 depicts a side view of a motorized tackle system in accordance with a preferred embodiment of the present application. It will be appreciated that system 201 overcomes one or more of the above-listed problems commonly associated with conventional tackle systems.

In the contemplated embodiment, system 201 includes one or more float devices 203 and one or more motorized lures 207 connected by a cable 205 as shown in FIG. 2.

Figure 3:
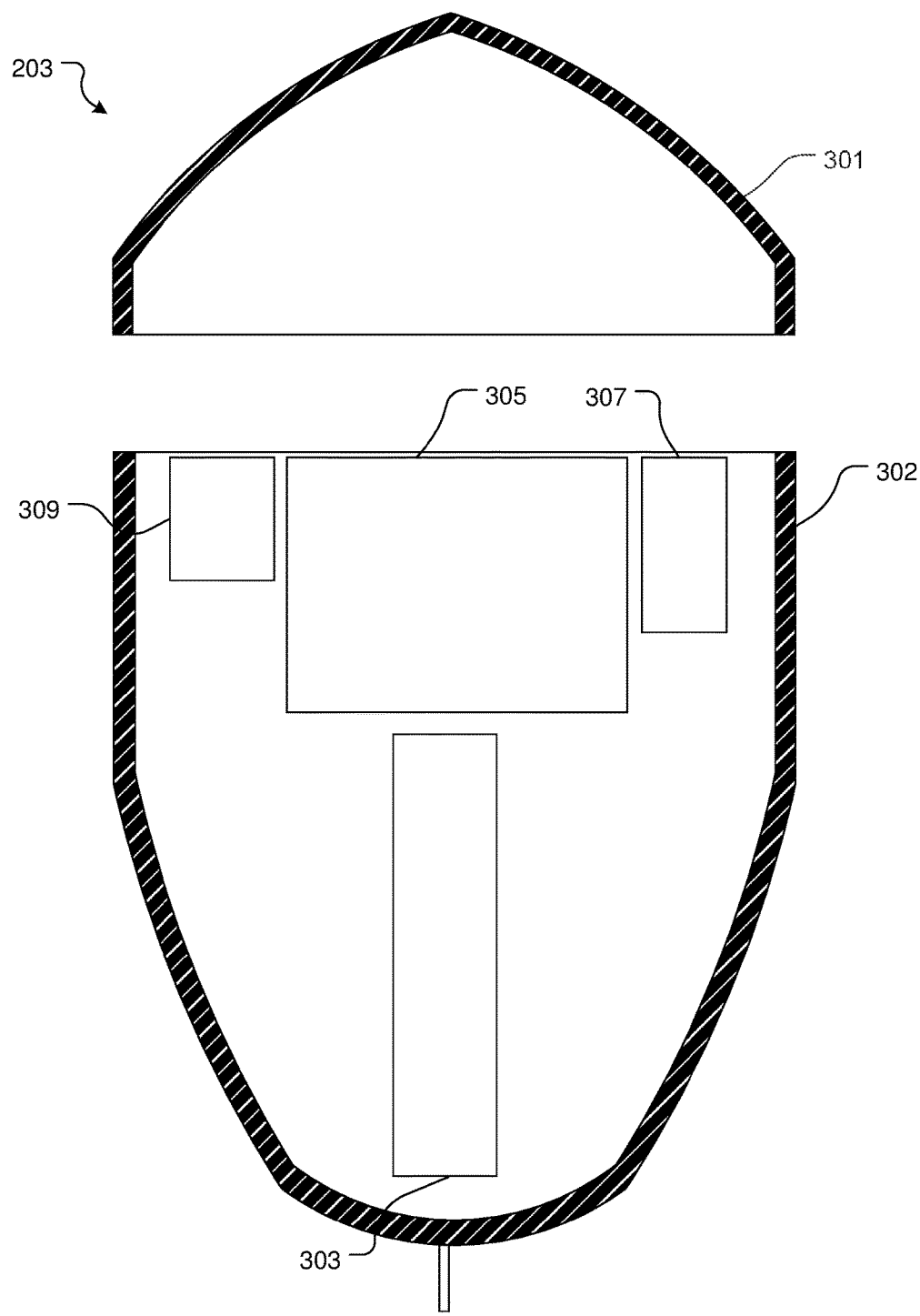
FIG. 3 is a side cut away view of the float device shown in FIG. 2.

The float device 203, as shown in FIG. 3, comprises an upper outer shell 301, and a lower outer shell 302, one or more batteries 303, one or more microcontrollers 305, one or more input ports 307, and a power switch 309. In use electrical current is sent between the battery 303 and the microcontroller 305 to adjust the movement of the motorized lure 207. It will be appreciated that data sent through the input port 307 changes the programming in the microcontroller.

Figure 4:
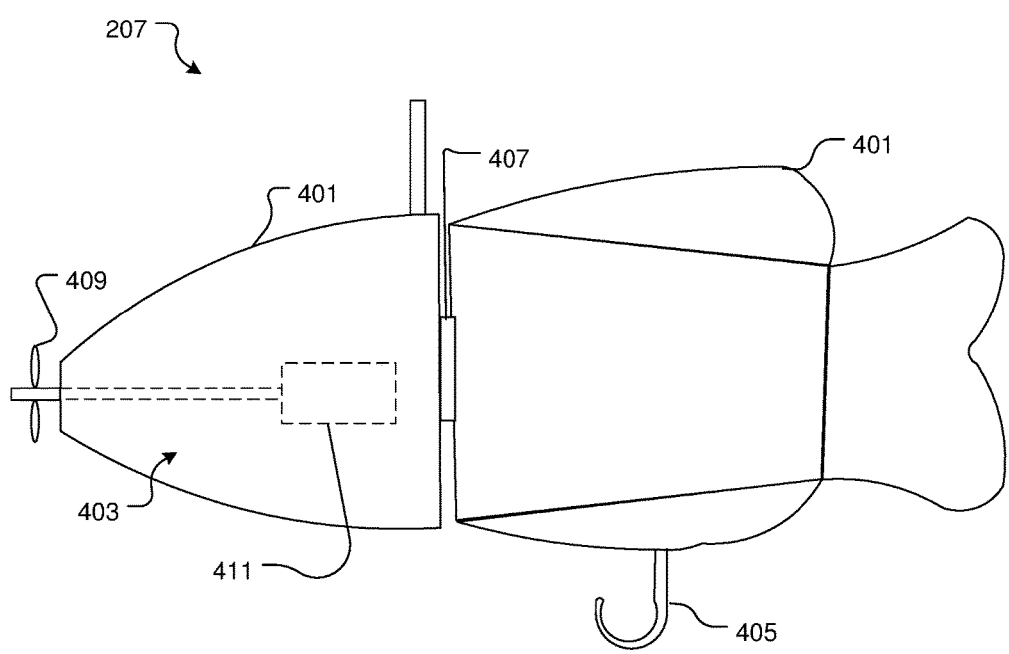
FIG. 4 is a side view of the motorized lure shown in FIG. 2.

Additionally the motorized lure 207, shown in FIG. 4, comprises a fish like body 401 with one or more sections connected via hinges 407, one or more means of propulsion 403, and one or more hooks 405. Although in the current embodiment an electric motor 411 and propeller 409 are shown in FIG. 4, it is contemplated that any means of propulsion may be used to move the motorized lure 207, such as jets, flippers, micro water pumps, and the like. While the location of the battery 303, microcontroller 305, input port 307, and power switch 309 have been shown in the float device 203, it is contemplated that they could be located in the motorized lure 207.

It should be appreciated that one of the unique features believed characteristic of the present application is the life-like motion of the motorized lure 207. It will also be appreciated that the microcontroller 305 allows the motorized lure 207 to be programmed with any movement routine.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A powered fishing lure, comprising:
a first section forming a fluidly sealed cavity;
a battery carried within the cavity of the first section;
a second section forming a fluidly sealed interior area;
a hinge secured to and disposed between the first section and the second section, the hinge is configured to enable pivoting movement of the first section relative to the second section;
an electric motor carried within the fluidly sealed interior area and conductively coupled to the battery;
a propeller positioned outside the second section and secured to the electric motor via a drive shaft;
a hook secured to the second section;
a flotation device secured to second section via a cable, the flotation device having:
an upper shell connected to a lower shell that forms a housing; and
a microcontroller carried within the housing and conductively coupled to the electric motor, the microcontroller is configured to control a rotational movement of the propeller;
wherein the propeller drives the fish lure;
wherein the cable is flexible, which in turn enables upward and downward movement of the first section and the second section relative to a water surface.

* * * * *